Sept. 12, 1939.  J. W. ANDERSON  2,172,928
WINDSHIELD WIPER
Filed Dec. 21, 1935
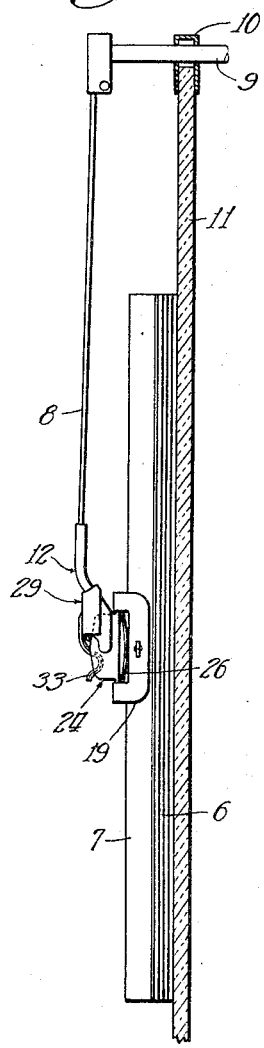
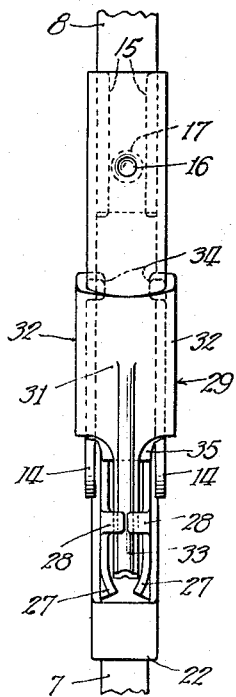
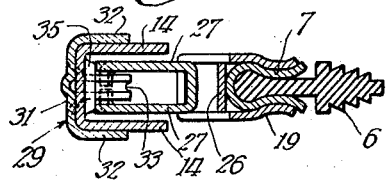
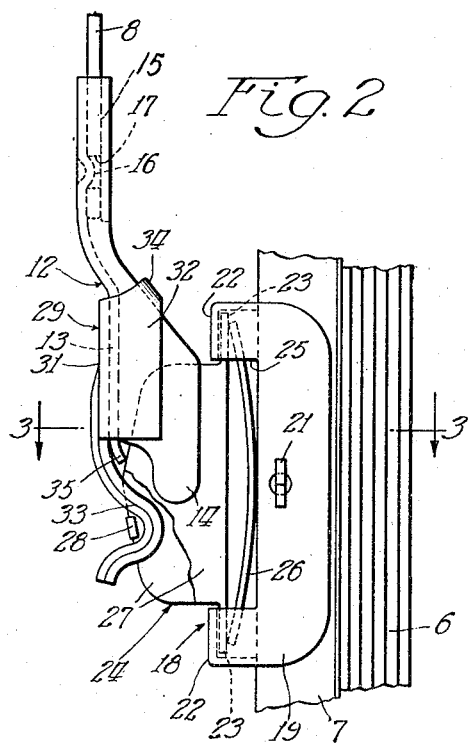
Inventor:
John W. Anderson
By Hill & Hill
Attys.
Witness:
V. Silfander Patented Sept. 12, 1939

2,172,928

UNITED STATES PATENT OFFICE 2,172,928

WINDSHIELD WIPER

John W. Anderson, Gary, Ind., assignor to Productive Inventions, Inc., Gary, Ind., a corporation of Indiana Application December 21, 1935, Serial No. 55,578

9 Claims. (Cl. 15—250)

This invention relates to windshield wipers, and particularly to means for assembling the wiper blade and operating arm therefor in a manner to support the blade in operative position on the arm.

Among other objects, the present invention is intended to provide novel means for connecting the windshield wiper blade or element and mounting therefor to an operating arm.

Another object of the invention is to provide novel means for mounting and removably securing the connecting member on the operating arm in a manner to be readily and quickly connected thereto and disconnected therefrom.

A further object of the invention is to provide a one-piece connecting member adapted to be readily connected to and removed from a wiping blade element and the operating arm therefor.

A still further object of the invention is to improve devices of the character described in sundry details hereinafter referred to and particularly pointed out in the appended claims.

One embodiment of the present invention is shown for illustrative purposes in the accompanying drawing, in which:

Fig. 1 is an elevational view of a windshield wiper blade and operating arm assembly showing its application to the windshield of a motor vehicle, or the like, and illustrating an embodiment of the present invention associated therewith;

Fig. 2 is an enlarged side elevational view of the structure illustrated in Fig. 1, and having a portion thereof broken away to more clearly disclose certain portions of the present invention;

Fig. 3 is a transverse sectional view taken substantially as indicated by the line 3—3 of Fig. 2; and Fig. 4 is a front elevational view of my improved wiper blade and arm connector as viewed from the left side of Fig. 2.

In the drawing, the present invention is shown in relation to a windshield wiper blade comprising a wiping element 6 and a support 7 therefor operatively connected to a wiper or operating arm 8 shown in Fig. 1 as operatively connected to a rock shaft 9 mounted to oscillate in a bearing portion 10 of a windshield frame provided for supporting a windshield indicated at 11.

The operating or wiper arm 8, illustrated in the drawing, is provided adjacent its free end with a channel-shaped member, indicated as a whole by the numeral 12, and comprising a bottom portion 13 and spaced side walls 14 extending laterally from the base portion, the channel-shaped member 12 being also provided adjacent its upper end with inwardly turned edge portions 15 adapted to engage the opposite edges of the arm 8 and to be secured against longitudinal movement with respect thereto by a protuberance 16 extending into an aperture 17 formed in the arm 8 as clearly illustrated in Fig. 2.

The wiper blade comprising the element 6 and support 7 is shown, in the present instance, as provided with a wiper arm mounting, indicated as a whole by the numeral 18, and comprising a clip 19 adapted to straddle the support 7 and be secured thereto by suitable means such, for example, as a cotter pin 21.

As shown for illustrative purposes, the clip 19 is provided with bight portions 22 adjacent its opposite ends adapted to loosely receive oppositely disposed portions 23 formed at opposite ends of a U-shaped hanger 24 forming a part of the wiper blade mounting 18 and positioned in a recess 25 formed in the clip 19 between the bight portions 22 thereof, the oppositely disposed portions 23 being yieldingly retained in the bight portions 22 of the clip by means of a resilient member shown, in the present instance, as a flat spring 26.

The U-shaped hanger 24 forming a part of the wiper blade mounting 18 is shown, in the present instance, as provided with side walls 27 having inwardly extending lugs 28 formed thereon adjacent their outer edges and adapted to substantially span the space between said side walls as clearly shown in Fig. 4.

For connecting the arm 8 and its channel-shaped member 12 to the arm mounting 18, a saddle-like connector, indicated as a whole by the numeral 29, is provided and comprises an elongated base 31 having substantially flat spaced leg portions 32 extending laterally therefrom at the opposite longitudinal edges of the base and adapted to straddle or overlie the member 12 and side portions 14 thereof, the said connector 29 having a hook 33 formed thereon extending longitudinally therefrom adjacent one end of the connector in a manner to engage the inwardly extending lugs 28 formed on the side walls 27 of the U-shaped hanger 24 forming a part of the wiper blade mounting 18 for removably securing the connector 29 thereto.

For removably securing the connector 29 to the channel-shaped member 12, the leg portions 32 of the connector at their ends opposite the hooked end portion of the connector are shown, in the present instance, as provided with laterally and inwardly extending fingers 34 adapted to engage the adjacent edges of the side portions 14 of the member 12 in a manner to secure the connector against longitudinal movement in one direction and against accidental displacement with respect thereto at one end thereof, the member 12 being provided with a projection 35 adapted to engage the edge portions of the side walls 27, which, operating in conjunction with the lug 28 and hook 33, serves to retain the connector 29 against accidental displacement at its opposite end with respect to the member 12.

It will be noted by reference, particularly to Fig. 4, that the inner adjacent ends of the fingers 34 are spaced from each other sufficiently to receive the arm 8 and to be rotated thereon in a manner to bring the connector into operative alignment with the upper end portion of the member 12 so that the connector may be slid downwardly thereon into operative position as shown in the drawing, thereby providing suitable means for readily mounting the connector on the arm and removing it therefrom.

Obviously, the present invention is not limited to the precise construction and arrangement shown and described as the same may be variously modified. Moreover, all the features of the invention need not be used conjointly as the same may be used to advantage in variously different combinations and subcombinations.

What I claim as new and desire to secure by Letters Patent is:

1. In a device of the class described and in combination, a wiper blade mounting having laterally spaced substantially parallel side walls, an inwardly extending lug on one of said walls, a channel-shaped member on the free end of a wiper arm and having spaced side portions engaging the walls of said mounting at opposite sides thereof, said member having a projection adjacent one of its ends engaging the edge portions of said side walls, a saddle-like connector removably mounted on said member and having leg portions at opposite sides thereof, a hook on said connector positioned between said walls and engaging said lug, and means on said connector engaging the side portions of said member for securing said connector removably to said member.

2. In a device of the class described and in combination, a wiper blade mounting having laterally spaced substantially parallel side walls, an inwardly extending lug on one of said walls, a channel-shaped member on the free end of a wiper arm and having spaced side portions engaging the walls of said mounting at opposite sides thereof, said member having a projection adjacent one of its ends engaging the edge portions of said side walls, a saddle-like connector removably mounted on said member and having leg portions at opposite sides thereof, a hook on said connector positioned between said walls and engaging said lug, and inwardly extending spaced fingers on said connector engaging the ends of the side portions of said member opposite said projection for securing said connector removably to said member.

3. A connector comprising a saddle-like member having a base, a pair of spaced leg portions thereon, a hook formed integrally with said base extending longitudinally therefrom adjacent one end of said base between the planes of said leg portions, and oppositely disposed inwardly extending securing fingers adjacent the ends of said leg portions opposite the hooked end of said member.

4. A connector comprising a saddle-like member having a base, a pair of spaced leg portions extending laterally from the opposite longitudinal edge portions of said base, a hook formed integrally with the base adjacent one end thereof, and inwardly extending securing fingers on said leg portions adjacent the opposite end of said base from said hook.

5. A connector comprising a saddle-like member having an elongated base, a pair of spaced elongated leg portions on said base and extending longitudinally thereof, a hook adjacent one end of said connector and having a width less than the distance between said spaced leg portions, and inwardly extending securing fingers spaced from each other on the respective leg portions adjacent the opposite end of said base from said hook.

6. A connector comprising an elongated saddle-like member having a base, a pair of substantially flat laterally spaced leg portions extending laterally from the opposite longitudinal edge portions of said base, a hook extending longitudinally from one end of said connector and between the planes of said leg portions, and inwardly extending securing fingers spaced from each other on the respective legs adjacent the opposite end of said base from said hook.

7. In a device for connecting a wiper blade to an actuating arm therefor, and in combination, a wiper blade mounting member adapted to be secured to a wiper blade, a channel shaped member on the free end of said actuating arm and having spaced side portions for engaging said blade mounting at opposite sides thereof, a connector having a base adapted to be positioned upon the base of said channel shaped member, a pair of spaced leg portions extending laterally from the opposite longitudinal edge portions of said base toward the wiper blade and adapted to be positioned at opposite sides of said actuating arm, attaching means adjacent one end of said connector and adapted for attachment to said mounting to provide a pivotal connection therewith, and securing fingers on said connector adjacent the opposite end thereof and adapted for engagement with the actuating arm.

8. In a device for connecting a wiper blade to an actuating arm therefor, and in combination, a wiper blade mounting member adapted to be secured to a wiper blade, a connector having a base adapted to be positioned upon said actuating arm, a pair of spaced leg portions extending laterally from the opposite longitudinal edge portions of said base toward the wiper blade and adapted to be positioned at the opposite outer sides of said actuating arm, attaching means adjacent one end of said connector and the actuating arm and adapted for attachment to said mounting to provide a pivotal connection therewith, and securing fingers on said connector leg portions adjacent the opposite end of said connector and adapted for engagement with said actuating arm.

9. In a device of the class described and in combination, a wiper blade mounting having lateraly spaced substantially parallel side walls, an inwardly extending lug on one of said walls, a channel shaped member on the free end of a wiper arm and having spaced side portions engaging the walls of said mounting at opposite sides thereof, said member having a projection adjacent one of its ends engaging the edge portions of said side walls, a saddle like connector removably mounted on said member and having leg portions at opposite sides thereof, a projection on said connector positioned between said walls and engaging said lug, for pivotally mounting the connector thereon, and means on said connector engaging the side portions of said member for securing said connector removably to said member.

JOHN W. ANDERSON.